March 14, 1950  R. E. DRAKE  2,500,632
ELECTROLYTIC DEVICE
Filed Dec. 28, 1946

INVENTOR
R. E. DRAKE
BY
Walter C. Kiesel
ATTORNEY

Patented Mar. 14, 1950

2,500,632

UNITED STATES PATENT OFFICE 2,500,632

ELECTROLYTIC DEVICE

Ralph E. Drake, Palisade, N. J., assignor to Bell Telephone Laboratories, Incorporated, New York, N. Y., a corporation of New York Application December 28, 1946, Serial No. 718,945

4 Claims. (Cl. 175—315)

This invention relates to electrolytic devices and more particularly to electrolytic capacitors of the type having means for relieving high gas pressures created within the capacitors because of a heating thereof due to abnormal operating conditions.

There are a number of conditions giving rise to high internal gas pressures arising among which may be mentioned: over-voltages such as might occur under open-circuiting conditions of the load in rectifying circuits, application of potentials with reverse polarity or polarized capacitors, and improper electrolyte and poor oxide film formation permitting large direct current leakage currents at elevated temperatures.

Usually the capacitor element of an electrolyte capacitor is sealed in a container of metal, such as aluminum. If the condenser is overheated due to abnormal operating conditions, the vaporized moisture of the electrolyte of the capacitor can result in a very violent explosion unless the container is properly vented.

Although a satisfactory form of vent from a safety standpoint might be one which functions as a result of pressure alone, it is difficult to provide such a vent.

One object of this invention therefore is to increase the reliability of electrolytic capacitors.

Another object of the invention is to decrease the dangers due to explosion of electrolytic capacitors.

Another object of the invention is to improve the sealing and venting of electrolytic capacitors.

In accordance with one feature of this invention, a combination thermal and pressure vent is provided for an electrolytic capacitor to enable the escape of gases when it becomes overheated.

In accordance with another feature of the invention the sealing means for the pressure relief means for an electrolytic device has a coefficient of expansion substantially the same as that portion of the device wherein it is situated.

These and other features of the invention will be understood more clearly and fully from the following detailed description when read in connection with the accompanying drawing in which.

Figure 1:
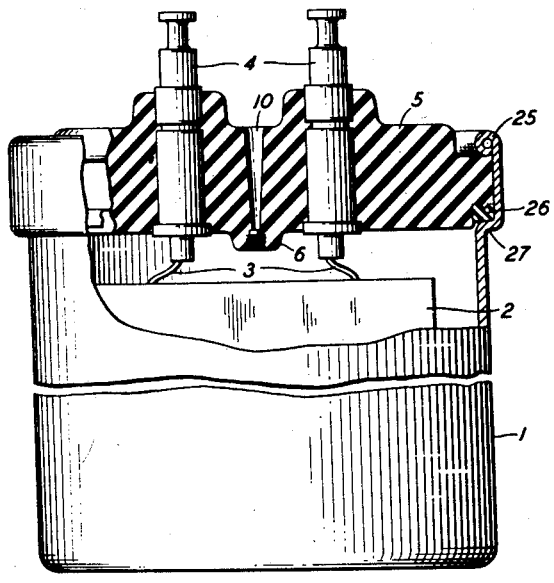
Fig. 1 is an elevational view, partly in section of an electrolytic capacitor including a vent constructed in accordance with this invention, a portion of the container being broken away.

Referring now to the drawing, the electrolytic capacitor there shown comprises a container 1 which may be of metal, such as aluminum, an electrolytic capacitor or capacitor element 2, having wires 3 connected to terminals 4 which may be embedded in a cover 5 of insulating material, for example, a phenolic condensation product, having a boss or stud 6 integrally formed therewith. The purpose of the boss is to provide better sensitivity to the heat emitted by the capacitor element. The cover plate 5 is held in place by crimping the edge 25, a suitable gasket 26 being interposed between the cover plate 5 and a shoulder 27 on the container 1. An aperture 10 extends through the cover plate 5 and the center of the boss 6. This aperture 10 is tapered where it passes through the main portion of the cover plate.

A shoulder 11 and a threaded portion 12 are provided in the boss portion of the aperture for the plugging materials.

Plugging materials for vents, such as waxes and asphalts, usually used, have a very high coefficient of expansion which frequently causes them to loosen in the vent and destroy the seal, especially at low temperatures.

To overcome this difficulty a plugging material for the inner end of the aperture 10, i. e., in the boss, is provided consisting of an eutectic metal alloy element in the form of a disc 15 (Fig. 2) which is first disposed in the aperture of the boss and a hot melt plastic material 16 having ethyl alcohol as a base combined with iron oxide to improve its heat conductivity is then deposited in said aperture.

The plastic material preferably has a thermal coefficient of expansion similar to that of the insulating material of the cover 10 so that a gastight seal in the cover over the required range of temperature may be maintained. At temperatures sufficiently high to generate explosive gas pressures the plastic material softens or liquefies and is ejected to relieve the pressure. The liquefying temperature of one of the plastic materials employed in carrying out this invention was about 165° C. This material will extrude at 100° C. due to cold flow through the aperture under a gas pressure of five to ten pounds per square inch.

Figure 2:
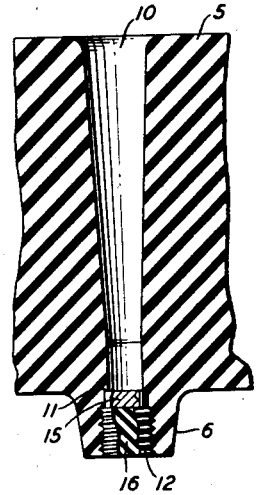
Fig. 2 is an enlarged sectional view of the vent embodied in the device shown in Fig. 1, a portion of the vent being broken away.

In order to prevent cold flow and premature venting at the elevated temperatures and internal gas pressures to which capacitors are subjected in normal service, the disc or pellet of eutectic alloy is anchored adjacent to the plastic material as an outer blocking or strengthening member. The disc 15 shown in Fig. 2 is an alloy of bismuth, tin and lead having a very sharp melting point at about 97° C. A suitable proportion of these materials is 50 per cent bismuth, 18.8 per cent tin and 31.2 per cent lead. A disc having a diameter of .080 inch and a thickness of .030 inch has been employed successfully. The thickness of the disc is dependent primarily on the strength required to resist the heat of the plastic material during injection.

The hot plastic material may be injected into the aperture in the boss under suitable pressure. The pressure must be sufficient to insure that the plastic material is forced into the spaces around the metal disc and into the anchoring threads. The diameter of the disc 15 is made slightly smaller than the diameter of the aperture in which it rests to facilitate assembly and to insure sufficient air leakage around the disc to prevent the trapping of air and the formation of bubbles in the plastic material. The portion of the aperture occupied by the plastic material is threaded to increase the effective length of the seal and to retain the plastic material in position.

Figure 3:
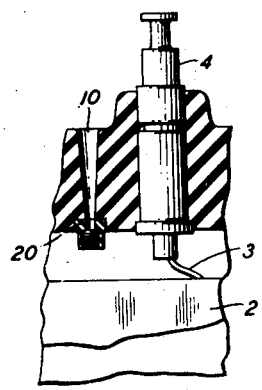
Fig. 3 is a fragmentary sectional view showing a modification of the vent of Fig. 1.
Figure 4:
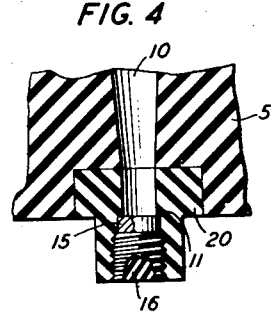
Fig. 4 is an enlarged sectional view of a fragment of the modification shown in Fig. 3, a portion of the plugging material being shown in section.

Figs. 3 and 4 show a modification of the arrangements shown in Figs. 1 and 2, the modification consisting of utilizing a phenolic insert 20 instead of molding a boss integrally with the cover member 5. The insert 20 may be cemented firmly into the cover by the use of any suitable cementing material, for example, a cold setting formaldehyde resin.

Although specific embodiments of the invention are shown and described, it is to be understood, of course, that various modifications may be made therein without departing from the scope and spirit of the invention as defined in the appended claims.

What is claimed is:

1. In an electrolytic device including a metallic container adapted to enclose an electrolyte hermetically sealed therein, means for relieving excessive pressure created within said container by overheating said electrolyte, said means including an eutectic alloy member in combination with a backing member of thermoplastic material adapted to remain solid and sealed in the container at normal temperatures and to fuse at abnormal operating temperatures.

2. In an electrolytic device including a metallic container enclosing an electrolytic member sealed therein, means for relieving excessive pressure within said container including a disc of an eutectic alloy in combination with a plastic material having ethyl cellulose as a base combined with iron oxide.

3. An electrolytic device comprising a metallic container, a cover of insulating material for said container having an aperture therein, and a plug in said aperture comprising an alloy of bismuth, tin and lead and a plastic material having a coefficient of expansion substantially equal to that of the insulating material of the cover.

4. An electrolytic device comprising a container having an electrolytic element therein, said container having an aperture in a wall thereof, one portion of the boundary of said aperture being threaded, another portion of said aperture being provided with a shoulder, a disc of an eutectic alloy in said aperture resting against said shoulder, and a thermoplastic material adjacent said disc and positioned in the threaded portion of said aperture.

RALPH E. DRAKE.

REFERENCES CITED

The following references are of record in the file of this patent:

UNITED STATES PATENTS

| Number | Name | Date |
|---|---|---|
| 2,012,359 | Sprague | Aug. 27, 1935 |
| 2,058,773 | Cole | Oct. 27, 1936 |
| 2,282,459 | Deeley | May 12, 1942 |

OTHER REFERENCES

Handbook of Chemistry and Physics, 26th edition, by Hodgman and Holmes, published by Chemical Rubber Publishing Co., page 1200.